J. Anthony.
Car-Axle.
№ 72584   Patented Dec. 24, 1867.
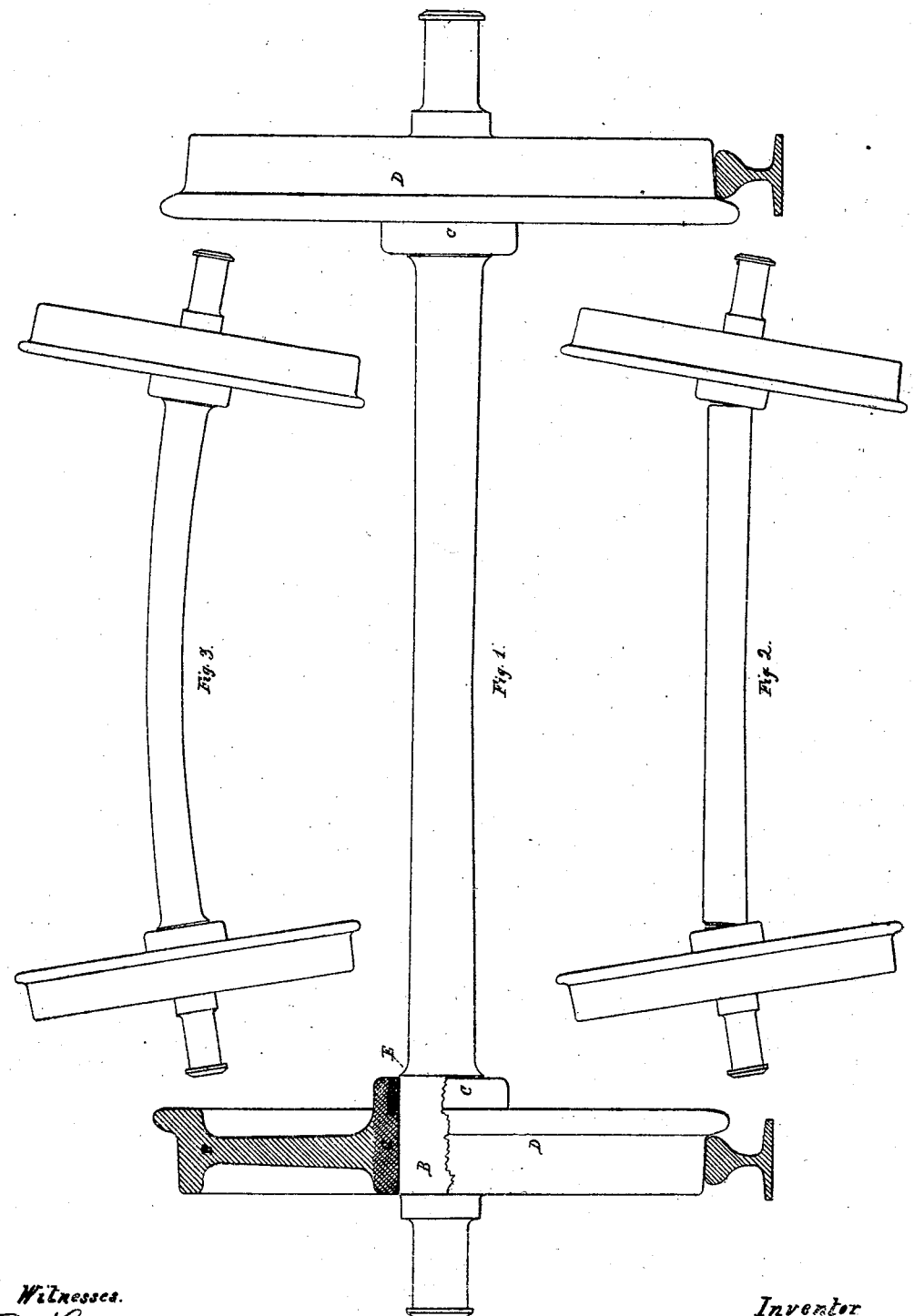
Witnesses.
Inventor
Joseph Anthony.

United States Patent Office.

JOSEPH ANTHONY, OF GREENBUSH, NEW YORK.

Letters Patent No. 72,584, dated December 24, 1867.

---

IMPROVED CAR-AXLE.

---

The Schedule referred to in these Letters Patent and making part of the same.

---

TO ALL WHOM IT MAY CONCERN:

Be it known that I, JOSEPH ANTHONY, of Greenbush, Rensselaer county, State of New York, have invented certain Improvements in the Construction of Car-Axles for Railroads; and I declare the following specification, with the drawings accompanying it, to be a full and perfect description of my invention.

Figure 1 represents my improved axle.

Figure 2 represents the manner in which the concentrated vibrations of the common axle are developed.

Figure 3 represents the manner in which the vibrations in my improved axle are distributed.

The nature of my invention consists in providing a car-axle with an enlarged boss, so as to form a shoulder, which, by the operation of the wheel, distributes the vibrations and strain commonly sustained at a given point, over a greater portion of its length, the object being to make them practically of uniform strength throughout, and thus to increase their safety and durability.

My improved axle A is constructed by any of the ordinary processes, and of any of the ordinary forms, with these exceptions: The part B covered by the hubs C of the wheels D, (technically known as the boss,) is, by the operation of casting, hammering, rolling, or any manner of forging or finishing, made enlarged over and above the central or body of the axle. From the inner termination of this enlarged part or boss, and commencing close to the hub of the wheel, the metal tapers down with a curve till it is of equal thickness with the body of the axle at the junction of the curve therewith. In practice I prefer to have the boss an inch, or thereabout, greater in diameter than the next inner portion of the axle, and I unite the two parts with a circle of an inch radius or thereabout, as at F, fig. 1. From the inner end of this curve to the centre, or thereabout, lengthwise, the axle should of right be slightly tapering, or it may, if preferred, be of equal diameter. The object of the enlarged boss and its curved connection is not, by an increase of metal to increase the strength *per se* of the axle, but to transmit or throw to and distribute over its other and more central portions the vibrations that in ordinary axles are concentrated, and so granulate the metal as to cause fracture at the points indicated by the same in fig. 2.

The operation of an axle constructed and finished as described, is as follows: By the perfect contact of the metals of the wheel and axle, the oneness of structure as it were, the vibrations in an ordinary axle, unprovided with an enlarged boss and shoulder, are, in use, commonly concentrated at that point immediately next the inner end of the hub of the wheel, and they cause such a granular condition of the metal, that when the fracture occurs, it generally takes place at that point, as shown in fig. 2. This vibration and consequent tendency to fracture, is by the enlarged boss and shoulder distributed, in my improved axle, over such a large central portion of its length as to be comparatively inoperative. By the use of the enlarged boss and shoulder, the axle may to a greater extent vibrate or spring, as shown in fig. 3, without causing granulation, or otherwise injuriously affecting the internal structure of the metal, and its durability is thereby increased.

What I claim as my invention, and desire to secure by Letters Patent, is—

An axle with an enlarged boss and shoulder, substantially as and for the purpose herein set forth.

JOSEPH ANTHONY.

Witnesses:
RICH. VARICK DE WITT,
D. W. DE WITT.